| United States Patent [19] | [11] Patent Number: 4,602,077 |
| Cecchin et al. | [45] Date of Patent: Jul. 22, 1986 |

[54] PLASTIC COPOLYMERS OF PROPYLENE WITH LINEAR DIENES HAVING CONJUGATED DOUBLE-BONDS AND PROCESS FOR PREPARING SAME

[75] Inventors: Giuliano Cecchin; Floriano Guglielmi, both of Ferrara; Francesco Zerega, Induno Olona, all of Italy

[73] Assignee: HIMONT Incorporated, Wilmington, Del.

[21] Appl. No.: 758,421

[22] Filed: Jul. 24, 1985

[30] Foreign Application Priority Data

Jul. 30, 1984 [IT]  Italy ............................... 22121 A/84

[51] Int. Cl.$^4$ .............................................. C08F 10/06
[52] U.S. Cl. ................................... 526/339; 525/315; 525/316
[58] Field of Search ................. 526/339; 525/315, 316

[56] References Cited

U.S. PATENT DOCUMENTS

| 3,914,207 | 10/1975 | Kang | 526/339 |
| 4,051,309 | 9/1977 | Kang | 526/339 |
| 4,052,545 | 10/1977 | Halasa | 526/339 |
| 4,200,722 | 4/1980 | Pennings | 526/339 |

*Primary Examiner*—Paul R. Michl

[57] ABSTRACT

Disclosed are plastic copolymers of propylene with linear dienes having conjugated double bonds, in particular with butadiene, characterized by a molar ratio between the dienic units in configuration 1,2 and those in configuration 1,4 higher than 0.2, preferably higher than 1.

Such copolymers are prepared by copolymerization of propylene with linear dienes in the presence of stereospecific catalysts comprising a halogen Ti compound supported on a Mg halide.

The copolymers can be reacted with radically polymerizable monomers, thus obtaining functionalized products suited to be transformed into films having good adhesion characteristics.

12 Claims, No Drawings

PLASTIC COPOLYMERS OF PROPYLENE WITH LINEAR DIENES HAVING CONJUGATED DOUBLE-BONDS AND PROCESS FOR PREPARING SAME

BACKGROUND OF THE INVENTION

From the scientific and patent literature it is known that it is possible to copolymerize propylene with 1,3-butadiene, in the presence of Ziegler-Natta catalysts, to obtain alternated or random copolymers.

It is known as well that the products so obtained contain butadiene units whose configuration is always prevailing of the 1,4-cis or trans type (see for example W. Cooper in "The Stereo Rubbers", Saltman ed., John Wiley & Sohns, New York 1977 and annexed quotations). These materials, because of their having the double bond inserted in the main chain, are easily subject to thermal degradation and even more to oxidative degradation.

Therefore, from the viewpoint of the product stability it would be of great interest to obtain copolymers having the butadiene linked in configuration 1,2 and, by consequence, the double bond in the side chain.

In fact it is known that the vinyl-type unsaturations give rise to scission.

Furthermore, according to the art, the copolymerization of propylene with butadiene must be accomplished at very low temperatures, generally below 0° C., and the catalytic activity is only corresponding to a few grams of polymer per gram of titanium.

THE PRESENT INVENTION

It has now surprisingly been found that the use of proper catalyst systems permits, in particular polymerization conditions, to obtain, with high catalytic yields, plastic copolymers of propylene with dienes having conjugated double bonds, in particular with 1,3-butadiene, in which at least 20% of the unsaturations is of the vinyl type.

The copolymers of propylene with butadiene which form the object of the present invention are characterized by:

an aggregate content of 1,3-butadiene ranging from 0.1 to 15% by weight, preferably from 1 to 10% by weight;

a molar ratio between the butadiene units in 1,2 configuration and the ones in 1,4 configuration higher than 0.2, preferably higher than 1;

an amount of product soluble in xylene at 25° C. lower than 20%, preferably lower than 15%.

Such copolymers are particularly suited to the preparation of films having excellent physical-mechanical properties and a low weldability temperature.

The copolymers of the present invention may contain, besides units from propylene and from 1,3-butadiene, also little amounts of units deriving from another olefinic monomer.

Particularly advantageous has proved the use of ethylene, in amounts ranging from 0.1 to 5% by weight, in the copolymer, because it permits to improve at the same time the activity of the catalyst and the weldability temperature of the product.

The process for preparing the new copolymers consists in polymerizing the propylene, in admixture with suitable amounts of a linear diene having conjugated double bonds, in particular 1,3-butadiene, optionally in admixture with ethylene and/or another alpha-olefin, in the presence of coordination catalysts comprising a titanium halide, carried on a magnesium halide, which are capable of promoting the stereoregular polymerization of propylene.

Catalysts capable of promoting the steroregular polymerization of propylene means the catalysts capable of producing, under optimum conditions, polypropylene with an isotacticity index higher than 80%.

Examples of particularly suited catalysts, as they are endowed with a high sterospecificity in propylene polymerization, are the ones described in U.S. Pat. Nos. 3,107,413; 3,107,414; 4,226,741; 4,277,589; European pat. appl. Nos. 0045975; 0045976; 0045977.

In these patents, the high stereospecificity of the catalyst is due to the presence of electron-donors as modifiers of the Al-alkyl compound and/or of the solid component containing the Ti compound. In the case of U.S. Pat. No. 3,107,413, the electron-donor is an ester of an organic or inorganic oxygenated acid. Esters of benzoic acid, of p.toluic acid, etc. are examples of representative compounds. In the case of European patent applications Nos. 0045975, 0045976, 0045977, the electron-donor compound is a Si compound containing at least a Si-OR bond (R=hydrocarbon radical). Examples of these compounds are methyltriethoxysilane, phenyltriethoxysilane, ethyltriethoxysilane.

Polymerization can be conducted continuously or discontinuously in liquid propylene or in the presence of an inert diluent, such as hexane, heptane, toluene, or in the gas phase or in a mixed liquid-gas phase.

Particularly advantageous is the copolymerization in liquid propylene in the presence of solid catalyst components having a narrow particle size distribution and a spheroidal form.

With a view to obtaining copolymers having the desired configuration of the units deriving from the diene it is essential to operate under molar conditions between alkyl alluminium and Lewis base (in the catalyst systems supported on magnesium halide, the Lewis base is utilized to impart stereospecificity to the system) such that the catalyst system may operate in a stereospecific manner, i.e. it may be capable of polymerizing the propylene to a polymer consisting for the most part of isotactic polypropylene.

Such ratio depends, as is known, on the catalyst system type.

With systems like those described in European patent applications Nos. 45,975, 45,976, 45,977, the ratio is generally lower than 40, preferably lower than 20, while in the case of systems like the ones described in U.S. Pat. Nos. 3,107,414, 4,226,741 and 4,277,589, said ratio is lower than 6, preferably lower than 4.

Also the polymerization temperature critically influences the polymer microstructure.

Such temperature generally ranges from 40° C. to 100° C., preferably it ranges from 60° C. to 80° C.

The aluminium alkyl concentration is not critical; generally it is preferred to operate in the concentration range from 1 to 50 m.moles/l.

The adjustment of the copolymer molecular weight occurs in the presence of chain transferors of the conventional type, such as for example hydrogen and $ZnEt_2$; the inherent viscosity is generally adjusted in a range of from 0.1 to 6 dl/g, preferably from 1 to 4 dl/g.

The concentration of the chain transferor has no appreciable effect on the copolymer microstructure.

The copolymer formed in the polymerization reaction can be optionally purified from the catalyst residues according to known techniques, for example by treatment with alcohols, propylene oxide and the like.

Furthermore, the copolymers can be cross-linked or modified by reactions typical of the unsaturated polymers, such as for example epoxidation, sulphonation, condensation with maleic anhydride, radicalic grafting of vinyl monomers, acrylic monomers, silanes, co-vulcanization with other unsaturated polymers etc.

In German application OS No. 2,434,668 there is described the grafting reaction conducted in suspension, in the presence of a radicalic starter and of a polymerizable monomer, of propylene/1,3-butadiene copolymers prepared with catalytic system $TiCl_3 AA$ and $AlEt_2Cl$, having the butadiene units prevailingly in position 1,4.

The reaction is conducted in the presence of specific solvents, such as ethylacetate, methylacetate; aromatic solvents such as benzene, toluene, xylene etc. and chlorinated solvents, such as chlorobenzene, chlorocyclohexane, etc.

Conversely, the reaction does not occur in the presence of aliphatic solvents, such as hexane, heptane, kerosene, etc. Of course, this is a drawback, because just these solvents are the ones generally utilized in the commercial-scale processes for polymerizing propylene.

In contrast with what is described in the cited patent, it has been found that the copolymers of the invention can be functionalized, either in solution or in suspension, also in the presence of aliphatic solvents and also in the dry state.

Furthermore, it has been found that the grafting reaction takes place even in the absence of peroxides and of other radicalic starters.

As examples of employable starters there may be cited all those which are polymerizable in radicalic manner, and in particular the vinyl monomers, such as acrylic acid, methacrylic acid and the esters thereof; glycidylacrylate and glycidylmethacrylate; vinylacetate; acrylamide; styrene; maleic anhydride and derivatives thereof; acrylonitrile; maleimide; silanes, such as vinyltriethoxy-silane and vinyltrimethoxy-silane, etc.

As possible radicalic starters there may be cited the peroxides, such as dibenzoyl peroxide, di-tert. butylperoxide, di-cumyl-perioxide, etc. the hydroperoxides, such as tert.dibutyl-hydroperoxide, cumylhydroperoxide, etc.; the peroxyesters, peroxyethers, peroxyketones, etc.; the azonitriles, such as azo-bis-isobutyronitrile, etc.

The amount of polymerizable monomer may range from 0.5 to 100% by weight with respect to the copolymer to be modified.

The amount of starter is generally lower than 5% by weight with respect to the copolymer, preferably lower than 1% by weight.

Starting product concentration and reaction temperature depend on whether the grafting reaction is to be carried out in suspension or in solution.

In the former case it is preferable to operate with concentrations ranging from 100 g to 500 g of polymers per liter of diluent at temperatures ranging from 60° C. to 90° C.

In the latter case it is preferably to work with polymer concentrations lower than 300 g of polymer per liter of solvent at temperatures ranging from 100° C. to 200° C.

The reaction time may range from 30 minutes to 10 hours, preferably from 1 hour to 5 hours.

The resulting functionalized copolymers are particularly suitable for being transformed into films having a good adhesion to metals or other inorganic substrates and polar polymers, or for being utilized as compatibilizing agents between polypropylene and the materials cited herein before.

EXAMPLE 1

A stainless steel 1.3-l autoclave, equipped with a magnetic stirrer and running at 400 rpm was used.

66 g of 1,3-butadiene, 230 g of propylene and 500 Nml of hydrogen were introduced into the autoclave in succession.

Into a separate cylinder there were introduced 5 ml of hexane, 0.114 g of solid catalytic component prepared according to example 20 of European patent application No. 0045977, 0.6 g of aluminium triethyl (TEA) dissolved in 4 ml of hexane and 0.171 g of diphenyl-dimethoxysilane (DPMS). The catalytic complex was then injected into the autoclave by means of propylene pressure. The temperature was then raised to 70° C. and kept constant allthrough the reaction. During polymerization, a proper propylene amount was continuously fed so as to keep the pressure in the autoclave constant.

4 hours after having added the catalyst complex, the reaction was stopped by addition of a few ml of an acetonic solution containing the stabilizer (Irganox 1010 and BRT). The unreacted monomers were removed by degassing, and the polymer was dried in an oven at 60° C. in a nitrogen stream.

The polymer properties and the polymerization conditions are indicated in Table I.

EXAMPLES 2 TO 7 AND COMPARATIVE EXAMPLES 1 AND 2

It was operated according to the modalities of example 1, with the exception that the molar ratio between TEA and DPMS was changed.

From the results recorded on Table I, the critical effect of the ratio between aluminium alkyl and the electron-donor compound on the copolymer microstructure is clearly apparent.

In particular, when such molar ratio was higher than 80, the butadiene amount present in configuration 1,4 and the percentage of xylene-soluble product drastically increase.

COMPARATIVE EXAMPLE 3

It was operated according to the general modalities of example 1. In this case, however, the monomers and the catalytic complex were introduced into the autoclave at 0° C. and such temperature was maintained also during the polymerization.

Results and reaction conditions are indicated on Table II.

EXAMPLES 8 TO 12 AND COMPARATIVE EXAMPLES 4 AND 5

In these examples, indicated in Table II, the general operative conditions of example 4 were employed, with the exception that the polymerization temperature was modified.

The obtained results clearly show the critical effect of the reaction temperature on the copolymer microstructure.

In particular, when such temperature was lower than 40° C., products having a high percentage of butadiene in configuration 1,4 and a high amount of xylene-soluble material was obtained.

EXAMPLES 13 TO 15

The same operative modalities of example 4 were substantially adopted, with the exception that the butadiene concentration in the reaction mixture was changed.

From the results indicated in Table III it can be noticed that the comonomer concentration is not critical for the copolymer microstructure.

EXAMPLES 16-17

The same operative modalities of example 4 were substantially adopted. In this case, however, the copolymerization of propylene with 1,3-butadiene was carried out in the presence of a proper ethylene amount. During the polymerization, a propylene/ethylene mixture, having a varying composition depending on the copolymer composition to be obtained, was fed, in order to mantain the pressure in the autoclave constant.

Results and operative modalities are recorded on Table IV.

On the basis of the results obtained it is inferable how the utilization of ethylene, in addition to propylene, permits to obtain copolymers having a melting temperature lower than the one of the copolymers obtained with propylene only, the amount of xylene-soluble material being equal.

EXAMPLES 18-19 AND COMPARATIVE EXAMPLE 6

The same autoclave and the same operative modalities of example 1 were employed. In this case, however, a catalytic system consisting of a solid component, prepared according to example 1 of U.S. Pat. No. 4,226,741, and of a co-catalyst consisting of a mixture of aluminium triisobutyl and trinormalbutyl (MAB) and methyl para-toluate (MPT), was used.

The results reported in Table V show how in this case the molar ratio between aluminium alkyl and electron-donor compound must be lower than 6.

EXAMPLE 20

As a product to be functionalized there was used a propylene/1,3-butadiene copolymer in flakes having the following characteristics: butadiene in 1,2 configuration = 2.6% by weight, butadiene in 1,4 configuration = 2.3% by weight, melt flow rate = 5.6 g/10′.

Into a four-neck flask having a 3-liter capacity, equipped with a stirrer, a cooler with nitrogen inlet pipe, there were introduced, in succession, 1,000 ml of normalheptane and 150 g of copolymer. Nitrogen was made to bubble through the suspension for about 1 hour, whereafter the mass temperature was brought, always under a nitrogen atmosphere, to 80° C. in about 30 minutes, by means of an oil thermoregulated bath.

Subsequently, under stirring, there were fed 10 g of maleic anhydride in powder and, after 5 minutes, 0.45 g of benzoyl peroxide. The reaction was carried on during 4 hours at a constant temperature of 80° C.

The polymer was then filtered and hot washed 5 times with 1 l of acetone.

There was obtained a product containing 0.6% by weight of maleic anhydride, determined by titration, and having a M.F.R. of 0.2 g/10′.

One gram of the obtained copolymer was compression molded, at a temperature of 200° C. during 10 minutes and at a pressure of 200 kg/cm$^2$, between two aluminium sheets having respectively the following sizes: 20×20 cm and 20×30 cm. From the resulting laminate there were obtained specimens having a width of 2.5 cm,—which, subjected to traction at 130° C. at a speed of 10 cm/min., exhibited an adhesive strength equal to 3.3 kg/cm.

EXAMPLE 21

Example 20 was repeated, with the exception that no peroxide was fed during the reaction.

A copolymer containing 0.65% by weight of maleic anhydride and having a M.F.R. of 4.18 g/10′ was obtained.

The adhesive strength to aluminium was equal to 3.2 kg/cm.

EXAMPLE 22

Example 20 was repeated with the exception that acrylic acid (10 g) instead of maleic anhydride was employed.

The copolymer obtained, after having been washed 5 times with 1 l of hot methanol each time, exhibited a content of 2.1% by weight of acrylic acid (determined by titration).

Such product, having a M.F.R. of 0.3 g/10′, exhibited an adhesion to aluminium equal to 2.5 kg/cm.

EXAMPLE 23

Example 22 was repeated, with the exception that azo-bis-isobutyronitrile (0.45 g) as radicalic starter was employed instead of benzoyl peroxide.

A copolymer containing 1.76% by weight of acrylic acid and having a M.F.R. of 0.02 g/10′ was obtained.

The adhesive strength of such product to aluminium was equal to 2.9 kg/cm.

EXAMPLE 24

Example 22 was repeated, with the exception that no radicalic starter was fed during the reaction.

There was obtained a copolymer containing 0.1% of acrylic acid, having a M.F.R. of 4 g/10′ and an adhesive strength to aluminium equal to 3.2 kg/cm.

EXAMPLE 25

Example 20 was repeated, with the exception that glycidylacrylate (10 g) was employed as a modifier instead of maleic anhydride.

There was obtained a copolymer containing 1.5% by weight of glycidylacrylate (determined by I.R.), having a M.F.R. of 0.01 g/10′ and an adhesive strength to aluminium equal to 2.4 kg/cm.

EXAMPLE 26

A propylene/1,3-butadiene copolymer having the following characteristics: butadiene in 1,2 configuration = 2.5% by weight, butadiene in 1,4 configuration = 1.4% by weight, M.F.R. = 3.73 g/10′ was employed as starting product.

The grafting reaction was carried out by means of the same equipment described in example 20. In this case, however, the starting copolymer was dissolved in kerosene under the following conditions: concentration = 200 g of polymer/l of solvent, temperature = 190° C.

Subsequently, maleic anhydride was fed in an amount equal to 33% by weight with respect to the copolymer, and the reaction was carried on during 7 hours in the absence of the radicalic starter.

The reaction mass was cooled, the polymer was coagulated with acetone and hot washed 5 times with acetone.

The resulting copolymer contained 1.62% by weight of maleic anhydride.

Such product, having a M.F.R. of 9.5 g/10′, exhibited in adhesion to aluminium equal to 3.4 kg/cm.

TABLE I

| EXAMPLE No. | 1 | 2 | 3 | 4 | 5 | 6 | 7 | 1/Cfr | 2/Cfr |
|---|---|---|---|---|---|---|---|---|---|
| TEA/DPMS moles | 0.5 | 1 | 3 | 7.5 | 20 | 40 | 60 | 80 | ∞ |
| $H_2$ Nml | 500 | 500 | 500 | 300 | 300 | 300 | 300 | 200 | 150 |
| Solid catalyst component g | 0.114 | 0.094 | 0.102 | 0.125 | 0.101 | 0.094 | 0.07 | 0.082 | 0.086 |
| Polymer g | 110 | 126 | 178 | 175 | 168 | 170 | 128 | 106 | 45 |
| Yield kg Pol/g Ti | 43 | 60 | 77 | 62 | 74 | 80 | 81 | 57 | 28 |
| Bound butadiene % b.w. 1.2/1.4 | 2.7 / 1.0 | 2.4 / 0.9 | 2.2 / 1.0 | 2.3 / 1.9 | 1.9 / 2.5 | 1.3 / 4.0 | 1.2 / 4.8 | 0.95 / 7.5 | 1.3 / 26 |
| Melting point °C. | 143.5 | 143 | 144 | 138.5 | 140.5 | 140.5 | 140 | 141 | 120–134 |
| Crystallization point °C. | 94 | 93 | 93 | 94 | 93 | 93 | 89.5 | 87 | 93 |
| X-ray crystallinity % | 55 | 56 | 50 | 53 |  | 47 | 51 |  |  |
| Acetone solubility % b.w. | 3.6 | 2.3 | 1.2 | 1.4 | 2.3 | 2.6 | 2.3 | 2.6 | 9.9 |
| Xylene solubility % b.w. | 3.8 | 6.4 | 7.7 | 10.4 | 8.3 | 14.7 | 16.6 | 33.9 | 61.6 |
| $[\eta]_{THN}^{135°\,C.}$ dl/g | 1.8 | 1.75 | 1.7 | 2.5 | 2.4 | 1.7 | 1.6 | 1.4 | 1.3 |
| M.F.R. g/10′ | 4.4 | 4.6 | 4.7 | 0.77 | 1.02 | 6 | 7 | 15.6 | — |

Polymerization conditions:
1.3-liter autoclave - TEA = 0.6 g. - Propylene = 230 g - Butadiene = 66 g - Temperature = 70° C. - Time = 4 hours
Pressure = 24.5 kg/cm$^2$ gauge.

TABLE II

| EXAMPLE No. | 3 Cfr | 4 Cfr | 5 Cfr | 8 | 9 | 10 | 12 |
|---|---|---|---|---|---|---|---|
| Fed propylene g | 223 | 190 | 202 | 209 | 218 | 230 | 249 |
| Fed butadiene g | 96 | 59 | 61 | 63 | 64 | 66 | 70 |
| $H_2$ Nml | 300 | 200 | 250 | 300 | 500 | 300 | 400 |
| Solid catalyst component g | 0.517 | 0.685 | 0.24 | 0.129 | 0.114 | 0.125 | 0.053 |
| Polymerization temperature °C. | 0 | 20 | 40 | 50 | 60 | 70 | 80 |
| Pressure kg/cm$^2$ g. | 3.8 | 7.4 | 12.95 | 15.9 | 20.05 | 24.5 | 30.4 |
| Polymer g | 17 | 90 | 106 | 98 | 176 | 175 | 120 |
| Yield kg Pol/g Ti | 1.4 | 5.8 | 19.6 | 34 | 69 | 62 | 100 |
| Bound butadiene % 1.2/1.4 b.w. | 3.4 / 38.3 | 0.8 / 14.4 | 1.5 / 8.4 | 1.7 / 6 | 1.97 / 1.96 | 2.3 / 1.90 | 1.4 / 0.7 |
| Melting point °C. | 139/147/153 | 153.5 | 151 | 147.5 | 146 | 138.5 | 144 |
| Acetone solubility % b.w. | 4.9 | 3.2 | 3.0 | 2.7 | 1.5 | 1.4 | 1.4 |
| Xylene solubility % b.w. | 21 | 19 | 16.1 | 12.8 | 10.5 | 10.4 | 3.4 |
| X-ray crystallinity % | 60 | 49 | 49 | 50 | 47 | 53 | 53 |
| $[\eta]_{THN}^{135°\,C.}$ dl/g | 1.8 | 1.5 | 1.6 | 1.55 | 1.6 | 2.5 | 2.1 |
| M.F.R. g/10′ | 5.1 | 11.4 | 7.9 | 9.2 | 7.2 | 0.77 | 2.1 |

TABLE III

| EXAMPLE No. | 13 | 14 | 15 |
|---|---|---|---|
| Fed propylene g | 260 | 230 | 226 |
| Fed butadiene g | 31 | 66 | 84 |
| $H_2$ Nml | 300 | 300 | 300 |
| Solid catalyst component | 0.0347 | 0.0743 | 0.104 |
| Pressure kg/cm$^2$ g. | 27 | 25.5 | 23.5 |
| Polymer g | 111 | 114 | 150.5 |
| Yield kg pol./g Ti | 146 | 70 | 64 |
| Bound butadiene % b.w. 1.2/1.4 | 1 / 0.9 | 2.05 / 1.4 | 2.6 / 2.3 |
| Melting point °C. | 147 | 142 | 137 |
| X-ray crystallinity % | 60 | 47 | 52 |
| Acetone solubility % b.w. | 1.4 | 1.9 | 1.6 |
| Xylene solubility % b.w. | 3 | 5.1 | 9.5 |
| $[\eta]_{THN}^{135°\,C.}$ dl/g | 1.7 | 1.4 | 2.2 |
| M.F.R. g/10′ | 6.1 | 12.5 | 1.5 |

Polymerization conditions:
TEA = 0.6 g - TEA/DPMS = 7.5 (moles) - Temperature = 70° C. - Time = 4 hours

TABLE IV

| EXAMPLE No. | 16 | 17 |
|---|---|---|
| Fed propylene g | 230 | 230 |
| Fed butadiene g | 66 | 66 |
| Fed ethylene g | 0.5 | 1.8 |
| $H_2$ Nml | 500 | 500 |
| Solid catalyst component g | 0.074 | 0.042 |
| Ethylene in feeding % by weight mixture (1) | 1.4 | 4.9 |
| Pressure kg/cm$^2$ g. | 24.75 | 24.8 |
| Polymer g | 185 | 122 |
| Bound butadiene % b.w. 1.2/1.4 | 1.8 / 1.2 | 1.7 / 1.2 |
| Melting point °C. | 138.5 | 124 |
| Acetone solubility % by weight | 3.2 | 0.8 |
| Xylene solubility % by weight | 8.2 | 13.8 |
| $[\eta]_{THN}^{135°\,C.}$ dl/g | 1.7 | 1.5 |
| M.F.R. g/10′ | 5.1 | 4.7 |

(1) During the reaction, a propylene/ethylene mixture is continuously fed in order to maintain the pressure constant

TABLE V

| EXAMPLE No. | 18 | 19 | Cfr 6 |
|---|---|---|---|
| MAB/MPT (moles) | 2.5 | 3 | 6 |
| H$_2$ Nml | 1500 | 1000 | 200 |
| Solid catalyst comp. g | 0.089 | 0.1 | 0.044 |
| Temperature °C. | 70 | 70 | 70 |
| Pressure kg/cm$^2$ g. | 25.65 | 25.2 | 24.5 |
| Polymer g | 125 | 166 | 136 |
| Yield kg Pol/g Ti | 81 | 96 | 179 |
| Bound butadiene % b.w. 1,2 / 1,4 | 0.75 / 0.7 | 0.66 / 1.0 | 0.6 / 8.3 |
| Melting point °C. | 143.5 | 143 | 130/139 |
| X-ray crystallinity % | | 52 | |
| Acetone solubility % by weight | 2 | 2.7 | 6.5 |
| Xylene solubility % by weight | 6.1 | 6.0 | 46.1 |
| $[\eta]_{THN}^{135°C.}$ dl/g | 1.6 | 2.0 | 1.35 |
| M.F.R. g/10' | 8.8 | 2.35 | 12 |

We claim:

1. Plastic copolymers of propylene with linear dienes having conjugated double-bonds and optionally with ethylene and/or other alpha-olefins, containing from 0.1 to 15% by weight of diene units, characterized in that the molar ratio between the diene units in 1,2 configuration and the ones in 1,4 configuration is higher than 0.2 and preferably higher than 1.

2. The copolymers according to claim 1, in which the diene is 1,3-butadiene.

3. The copolymers according to claim 2, in which the total content of 1,3-butadiene ranges from 1 to 10% by weight.

4. The copolymers according to claim 3, in which the amount of product soluble in xylene at 25° C. is lower than 20%.

5. The copolymers according to claim 4, characterized in that they comprise ethylene in an amount ranging from 0.1 to 5% by weight.

6. A process for preparing copolymers according to claim 1, by polymerization of mixtures of propylene with linear conjugated double-bond dienes optionally containing ethylene and/or another alpha-olefin, characterized in that the polymerization occurs in the presence of coordination catalysts comprising a titanium halide carried on a magnesium halide, which are capable of promoting the polymerization of the propylene to a polymer containing at least 80% of isotactic polypropylene.

7. The process for preparing copolymers according to claim 6, in which the catalysts are obtained from a titanium halide supported on a magnesium halide and from an electron-donor compound selected from the Si compounds containing at least a Si—OR bond (R=hydrocarbon radical).

8. The process according to claim 7, in which the molar ratio between aluminium alkyl and Si compound is lower than 40.

9. Grafted copolymers prepared by reacting the copolymers of claim 1 with one or more radically polymerizable unsaturated monomers.

10. Grafted copolymers according to claim 9, in which the radically polymerizable monomers are comprised among the following ones: acrylic acid, methacrylic acid and esters thereof; glycidylacrylate and glycidylmethacrylate; vinyl acetate; acrylamide; styrene; maleic anhydride and derivatives thereof; acrylonitrile; maleimide; vinyl-triethoxysilane and vinyltrimethoxysilane.

11. The process for preparing grafted copolymers according to claim 10, characterized in that the reaction between the copolymers of claim 1 and the radically polymerizable monomers is conducted in the presence of aliphatic solvents.

12. The process for preparing grafted copolymers according to claim 10, characterized in that the copolymers of claim 1 are reacted in the dry state with the radically polymerizable monomers.

* * * * *